US009058430B2

United States Patent
Pal et al.

(10) Patent No.: US 9,058,430 B2
(45) Date of Patent: *Jun. 16, 2015

(54) TESTING A SOFTWARE APPLICATION INTERFACING WITH MULTIPLE EXTERNAL SOFTWARE APPLICATIONS IN A SIMULATED TEST ENVIRONMENT

(75) Inventors: Kallol Pal, Bangalore (IN); Ashvini Kumar Saxena, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 13/602,731

(22) Filed: Sep. 4, 2012

(65) Prior Publication Data

US 2012/0331353 A1    Dec. 27, 2012

Related U.S. Application Data

(63) Continuation of application No. 11/284,756, filed on Nov. 22, 2005, now Pat. No. 8,291,387.

(51) Int. Cl.
*G06F 9/44* (2006.01)
*G06F 11/00* (2006.01)
(Continued)

(52) U.S. Cl.
CPC ........ *G06F 11/3688* (2013.01); *G06F 11/3664* (2013.01); *G06F 11/079* (2013.01); *G06F 11/3457* (2013.01)

(58) Field of Classification Search
CPC ........................ G06F 11/3409–11/3433; G06F 11/3466–11/3495; G06F 11/3664; G06F 11/3688; G06F 11/079; G06F 11/3457
See application file for complete search history.

(56) References Cited

U.S. PATENT DOCUMENTS 5,488,713 A * 1/1996 Norton et al. ............... 703/22
5,634,002 A   5/1997 Polk et al.
(Continued)

FOREIGN PATENT DOCUMENTS

EP          157760       9/2005

OTHER PUBLICATIONS

Saxena et al.; A Method fro Testing Software Applications with Multiple External Interfaces in a Simulated Test Environment; IBM Global Services India Pvt. Ltd.; Version 1; Aug. 6, 2004; 10 pages.
(Continued)

*Primary Examiner* — Tuan Q. Dam
*Assistant Examiner* — Zheng Wei
(74) *Attorney, Agent, or Firm* — Schmeiser, Olsen & Watts, LLP; John Pivnichny

(57) ABSTRACT

A method and system for testing a software application. A description of a test suite for testing the software application being tested (ABT) is inserted into a test database. The ABT is invokes multiple external software applications during execution of a test script of the test suite. Each external application invoked by the ABT is replaced by a corresponding simulator during execution of the test script. Output data to be returned to the ABT by each invoked simulator is inserted into the test database, after which each test script of the test suite is executed. The executing includes: sending a request, by the ABT to each simulator invoked in each test script, for requested data; and receiving, by the ABT, the requested data from each simulator invoked in each test script. The received requested data includes the output data that had been inserted into the test database.

19 Claims, 17 Drawing Sheets

(51) Int. Cl.
*G06F 11/36* (2006.01)
*G06F 11/07* (2006.01)
*G06F 11/34* (2006.01)

(56) References Cited

U.S. PATENT DOCUMENTS

| | | | |
|---|---|---|---|
| 5,680,584 | A | 10/1997 | Herdeg et al. |
| 5,790,829 | A | 8/1998 | Flynn |
| 5,862,319 | A | 1/1999 | Galetti |
| 5,862,362 | A * | 1/1999 | Somasegar et al. ............. 703/21 |
| 5,911,059 | A | 6/1999 | Profit, Jr. |
| 6,002,871 | A | 12/1999 | Duggan et al. |
| 6,158,031 | A | 12/2000 | Mack et al. |
| 6,188,975 | B1 * | 2/2001 | Gay ................................ 703/22 |
| 6,298,317 | B1 * | 10/2001 | Wiemann ........................ 703/22 |
| 6,434,513 | B1 | 8/2002 | Sherman et al. |
| 6,467,078 | B1 | 10/2002 | Matsuba et al. |
| 6,567,767 | B1 | 5/2003 | Mackey et al. |
| 6,691,259 | B1 | 2/2004 | Mackey et al. |
| 6,725,399 | B1 | 4/2004 | Bowman |
| 6,832,184 | B1 | 12/2004 | Bleier et al. |
| 6,856,951 | B2 * | 2/2005 | Moona et al. ................... 703/22 |
| 6,898,704 | B2 | 5/2005 | Louden et al. |
| 6,907,546 | B1 | 6/2005 | Haswell et al. |
| 6,944,848 | B2 * | 9/2005 | Hartman et al. ............. 717/124 |
| 7,055,067 | B2 | 5/2006 | DiJoseph |
| 7,089,534 | B2 * | 8/2006 | Hartman et al. ............. 717/125 |
| 7,290,145 | B2 | 10/2007 | Falkenthros |
| 7,310,798 | B1 | 12/2007 | Gunara et al. |
| 7,412,623 | B1 * | 8/2008 | Lindberg ........................ 714/33 |
| 7,523,447 | B1 | 4/2009 | Callahan et al. |
| 7,644,398 | B2 * | 1/2010 | Cleaveland et al. .......... 717/135 |
| 7,813,910 | B1 * | 10/2010 | Poulin ............................. 703/22 |
| 8,589,140 | B1 * | 11/2013 | Poulin ............................. 703/22 |
| 2002/0129338 | A1 * | 9/2002 | MacDonell ................... 717/126 |
| 2003/0009709 | A1 * | 1/2003 | Belenger et al. ................ 714/37 |
| 2003/0014734 | A1 * | 1/2003 | Hartman et al. ............. 717/125 |
| 2003/0208351 | A1 * | 11/2003 | Hartman et al. ............... 703/22 |
| 2004/0103396 | A1 * | 5/2004 | Nehab ........................... 717/127 |
| 2005/0160321 | A1 | 7/2005 | Cleaveland et al. |
| 2006/0136190 | A1 * | 6/2006 | Shibata .......................... 703/22 |
| 2006/0179422 | A1 * | 8/2006 | Gortler ......................... 717/124 |
| 2007/0079291 | A1 | 4/2007 | Roth |
| 2007/0089091 | A1 | 4/2007 | Larab et al. |
| 2007/0168744 | A1 | 7/2007 | Pal et al. |
| 2007/0168970 | A1 | 7/2007 | Li et al. |
| 2008/0222609 | A1 | 9/2008 | Barry et al. |

OTHER PUBLICATIONS

Compuware QARun Product Detail, retrieved from the Internet; URL: http://www.compuware.com/products/qacenter/401_ENG_NTLM.htm, retrieved on May 16, 2005, 4 pages.

Sneed, Harry M., Testing a Web Application, Proceedings of the Sixth IEEE International Workshop on Web Site Evolution, Sep. 11, 2004, 9 pages.

m-Test, intuwave, retrieved from the Internet; URL: http://www.intuwave.com/files/m-Test_Data_Sheet.pdf, 8 pages.

Gao, et al, Developing an Integrated Testing Environment Using the World Wide Web Technology; Proceedings of the 21st Annual International Computer Software and Applications Conference. Aug. 13-15, 1997, 8 pages.

Fonorow, Richard O., Modeling Software Tools with ICON, Proceedings of the International Conference on Software Engineering, Apr. 11-15, 1988, 19 pages.

Eskin, et al., Offline Simulation of a Managed System for Testing a Developed Management System, Proceedings of the IEEE Internationational Conference on Software: Science, Technology and Engineering, Nov. 4-5, 2003, 10 pages.

Office Action (Mail Date Sep. 2, 2009) for U.S. Appl. No. 11/285,756, filed Nov. 22, 2005.

Amendment filed Dec. 2, 2009 in response to Office Action (Mail Date Sep. 2, 2009) for U.S. Appl. No. 11/285,756, filed Nov. 22, 2005.

Office Action (Mail Date Feb. 19, 2010) for U.S. Appl. No. 11/285,756, filed Nov. 22, 2005.

Amendment filed Aug. 4, 2010 in response to Office Action (Mail Date Feb. 19, 2010) for U.S. Appl. No. 11/285,756, filed Nov. 22, 2005.

Final Office Action (Mail Date Aug. 4, 2010) for U.S. Appl. No. 11/285,756, filed Nov. 22, 2005.

Amendment filed Nov. 4, 2010 with Request for Continued Examination in response to Final Office Action (Mail Date Aug. 4, 2010) for U.S. Appl. No. 11/285,756, filed Nov. 22, 2005.

Advisory Action (Mail Date Nov. 9, 2010) for U.S. Appl. No. 11/285,756, filed Nov. 22, 2005.

Request for Continued Examination filed Dec. 3, 2010 in response to Advisory Action (Mail Date Nov. 9, 2010) for U.S. Appl. No. 11/285,756, filed Nov. 22, 2005.

Notice of Allowance (Mail Date Jun. 11, 2012) for U.S. Appl. No. 11/285,756, filed Nov. 22, 2005.

* cited by examiner

| Table Name | TestSuite | | | | |
|---|---|---|---|---|---|
| Description | Stores the data for the Test Suites in the Data Management Tool | | | | |
| Column Name | Column Type | Column Size | Is Key? | FK Table | Is Nullable? | Description |
| TestSuiteId | Char | 32 | PK | - | No | |
| TestSuiteName | Varchar | 64 | - | - | No | |
| TestSuiteDesc | Varchar | 256 | - | - | Yes | |

*FIG. 8*

| Table Name | TestCase | | | | |
|---|---|---|---|---|---|
| Description | Stores the data for the Test Cases in the Data Management Tool | | | | |
| Column Name | Column Type | Column Size | Is Key? | FK Table | Is Nullable? | Description |
| TestCaseId | Character | 32 | PK | - | No | |
| TestCaseName | Varchar | 64 | - | - | No | |
| TestCaseDesc | Varchar | 256 | - | - | Yes | |
| TestSuiteId | Character | 32 | FK | TestSuite | No | This column is a foreign key to the TestSuite table. |

*FIG. 9*

| Table Name | TestScript | | | | |
|---|---|---|---|---|---|
| Description | Stores the data for the Test Script in the Data Management tool | | | | |
| Column Name | Column Type | Column Size | Is Key? | FK Table | Is Nullable? | Description |
|---|---|---|---|---|---|---|
| TestScriptId | Char | 32 | PK | - | No | |
| TestScriptName | Varchar | 64 | - | - | No | |
| TestScriptDesc | Varchar | 256 | - | - | Yes | |
| TestCaseId | Char | 32 | FK | TestCase | No | This column is a foreign key to the TestCase table. |
| TestCaseLoc | Varchar | 256 | - | - | Yes | The location of the actual test script. This column acts as the link between the real test script and its logical definition in the data management tool. |
| TestToolId | Char | 32 | FK | TestToolSummary | No | This column is a foreign key to the TestTool table. |
| TestScriptType | Char | 8 | FK | TestScriptType | No | This column indicates if the Test Script will be executed manually or automatically. |

FIG. 10

| Table Name | TestToolSummary | | | | | |
|---|---|---|---|---|---|---|
| Description | Stores summary information about the test tools | | | | | |
| Column Name | Column Type | Column Size | Is Key? | FK Table | Is Nullable? | Description |
| TstToolId | Char | 32 | PK | - | No | |
| TstToolNm | Varchar | 64 | - | - | No | |
| TstToolDesc | Varchar | 256 | - | - | Yes | |
| TstToolLoc | Varchar | 256 | - | - | Yes | This column contains the details of the test tool adapter to be used by the data management tool to launch the testing tool |

*FIG. 11*

| Table Name | SimulatorSummary | | | | |
|---|---|---|---|---|---|
| Description | Stores some basic information about the simulators | | | | |
| Column Name | Column Type | Column Size | Is Key? | FK Table | Is Nullable? | Description |
| SimId | Character | 32 | PK | - | No | |
| SimNm | Character | 64 | - | - | No | |
| SimDesc | Varchar | 256 | - | - | Yes | |
| SimLoc | Varchar | 256 | - | - | Yes | The location of the simulator - path. |

FIG. 12

| Table Name | SimulatorContext | | | | |
|---|---|---|---|---|---|
| Description | Stores transient data for the simulator context | | | | |
| Column Name | Column Type | Column Size | Is Key? | FK Table | Is Nullable? | Description |
| SimContextId | Integer | - | PK | - | No | Auto generated key for the table starting at '0' |
| TestSuiteId | Character | 32 | FK | TestSuite | No | This column is a foreign key to the table TestSuite |
| TestCaseId | Character | 32 | FK | TestCase | No | This column is a foreign key to the table TestCase |
| TestScriptId | Character | 32 | FK | TestScript | No | This column is a foreign key to the table TestScript |
| StartTime | Timestamp | - | - | - | No | |

*FIG. 13*

| Table Name | TestScriptData | | | | |
|---|---|---|---|---|---|
| Description | The table that stores the mapping between a test case, simulator and the data for the combination | | | | |
| Column Name | Column Type | Column Size | Is Key? | FK Table | Is Nullable? | Description |
| TestScrDataId | Integer | - | PK | - | No | Auto Generated Surrogate Key |
| TestScriptId | Character | 32 | FK | TestScript | No | |
| RecId | Integer | - | FK | TableRecords | Yes | The record id is specified when the table type is generic. In this case the table name is null. |
| SimId | Character | 32 | FK | SimulatorSummary | Yes | All test scripts need not use a simulator |
| TableName | Character | 32 | FK | TableSummary | Yes | The TableName is specified when the table type is user defined. In this case the record id is null. This column is redundantly stored. |
| ScrDataTyp | Character | 8 | FK | ScriptDataType | No | |

*FIG. 14*

| Table Name | SimulatorError | | | | |
|---|---|---|---|---|---|
| Description | This table is updated by a Simulator at runtime when an error is detected in the input values received from the application at the simulator | | | | |
| Column Name | Column Type | Column Size | Is Key? | FK Table | Description |
| SimulatorErrorId | Integer | - | PK | - | |
| SimulatorContextId | Integer | - | FK | SimulatorContext | The context id for which the error is being logged |
| TestScriptId | Character | 32 | FK | TestScript | The test script id which is being executed |
| TestCaseId | Character | 32 | FK | TestCase | The test case to which the test script belongs |
| TestSuiteId | Character | 32 | FK | TestSuite | The test suite to which the test case belongs |
| SimulatorId | Character | 32 | FK | SimulatorSummary | The id of the simulator that recorded the error |
| SimulatorErrMess | Varchar | 256 | - | - | The error message logged by the simulator |

*FIG. 15*

| Table Name | TestExecutionResult | | | | |
|---|---|---|---|---|---|
| Description | Stores the result of the test execution | | | | |
| Column Name | Column Type | Column Size | Is Key? | FK Table | Is Nullable? | Description |
| TstExecResId | Integer | - | PK | - | No | Auto generated starting at '0' |
| TstResCd | Char | 8 | FK | TestResultCode | No | |
| TimeExec | Timestamp | - | - | - | No | |
| TstScriptId | Char | 32 | FK | TestScript | No | The id of the test script that was executed and for which the result is being logged |
| TstRunId | Char | 32 | FK | TestRunDetails | No | Foreign Key to the table that holds the details of the test runs |

*FIG. 16*

| Table Name | TestRunDetails | | | | |
|---|---|---|---|---|---|
| Description | Stores basic details about the run of a test suite | | | | |
| Column Name | Column Type | Column Size | Is Key? | FK Table | Is Nullable? | Description |
| TstRunId | Character | 32 | PK | - | No | |
| TstStartTime | Timestamp | - | - | - | No | |
| TstEndTime | Timestamp | - | - | - | Yes | |
| TstSuiteId | Character | 32 | FK | TestSuite | No | |
| TstRunComments | Varchar | 256 | - | - | Yes | |

FIG. 17

TESTING A SOFTWARE APPLICATION INTERFACING WITH MULTIPLE EXTERNAL SOFTWARE APPLICATIONS IN A SIMULATED TEST ENVIRONMENT

This application is a continuation application claiming priority to Ser. No. 11/284,756, filed Nov. 22, 2005, now U.S. Pat. No. 8,291,387, issued Oct. 16, 2012.

BACKGROUND OF THE INVENTION

1. Technical Field

The present invention provides a method and system for testing a software application interfacing with multiple external software applications in a simulated test environment.

2. Related Art

Organizations use multiple software applications to carry out their day-to-day activities. These organizations include large scale software applications that manage huge volumes of data, simple tools that are used to create documents, mailing and collaboration software, work flow management systems, etc. These diverse software applications may interact with each other to exchange data. There also exist software applications that interact with other software applications which may or may not reside within the same organization boundary. These applications may be critical to the functioning of an organization and any outages in these applications may result in financial losses.

To keep pace with the ever-changing business needs of an organization, software applications need to be constantly enhanced, which results in frequent code changes. Each time code is updated, applications need to be tested to ensure that not only that the impacted parts of the application work as expected, but also that no defects have been introduced in the applications due to side effects, which may be ensured by extensively testing the applications before the applications are deployed for use in the production systems.

Testing applications that have interfaces with multiple other applications has many challenges, such as getting access to all the interfacing applications, many of which may not even reside within the same organization. Though it is desirable to test an application with all its interfacing applications before the application is released to the production system, this may be difficult to achieve during the early testing cycles and during development. For example, during development, developers may require access to the interfacing applications to execute their unit test cases. In the lack of such access, developers are forced to release untested code to the testing systems. This results in larger number of defects being detected during testing and hence increasing the number of test cycles.

Thus, there is a need for a method and system for testing software applications having multiple interfacing applications in a manner that overcomes a lack of access of the interfacing applications.

SUMMARY OF THE INVENTION

The present invention provides a computer-implemented method for testing a software application in accordance with a test suite, said method comprising:

inserting into a test database a description of the test suite for testing the software application being tested (ABT), said ABT programmed to invoke multiple external software applications during execution of at least one test script of the test suite, each external application being replaced by a corresponding simulator such that the ABT invokes at least one of said corresponding simulators during execution of each test script;

inserting into the test database output data to be returned to the ABT by each simulator for each execution of each simulator in each test script, and after said inserting the description of the test suite and the output data into the test database, executing each test script of the test suite, said executing comprising:

sending a request, by the ABT to each simulator invoked in each test script of the test suite, for requested data; and receiving, by the ABT, said requested data from each simulator invoked in each test script of the test suite, wherein the received requested data comprises the output data that had been inserted into the test database prior to said executing.

The present invention provides a computer program product, comprising a computer usable medium having a computer readable program code embodied therein, said computer readable program code comprising an algorithm adapted to implement a method for testing a software application in accordance with a test suite, said method comprising:

inserting into a test database a description of the test suite for testing the software application being tested (ABT), said ABT programmed to invoke multiple external software applications during execution of at least one test script of the test suite, each external application being replaced by a corresponding simulator such that the ABT invokes at least one of said corresponding simulators during execution of each test script;

inserting into the test database output data to be returned to the ABT by each simulator for each execution of each simulator in each test script, and after said inserting the description of the test suite and the output data into the test database, executing each test script of the test suite, said executing comprising:

sending a request, by the ABT to each simulator invoked in each test script of the test suite, for requested data; and receiving, by the ABT, said requested data from each simulator invoked in each test script of the test suite, wherein the received requested data comprises the output data that had been inserted into the test database prior to said executing.

The present invention provides a computer system comprising a processor and a computer readable memory unit coupled to the processor, said memory unit containing instructions that when executed by the processor implement a method for testing a software application in accordance with a test suite, said method comprising:

inserting into a test database a description of the test suite for testing the software application being tested (ABT), said ABT programmed to invoke multiple external software applications during execution of at least one test script of the test suite, each external application being replaced by a corresponding simulator such that the ABT invokes at least one of said corresponding simulators during execution of each test script;

inserting into the test database output data to be returned to the ABT by each simulator for each execution of each simulator in each test script, and after said inserting the description of the test suite and the output data into the test database, executing each test script of the test suite, said executing comprising:

sending a request, by the ABT to each simulator invoked in each test script of the test suite, for requested data; and receiving, by the ABT, said requested data from each simulator invoked in each test script of the test suite, wherein the received requested data comprises the output data that had been inserted into the test database prior to said executing.

The present invention provides a process for deploying computing infrastructure, said process comprising integrating computer-readable code into a computing system, wherein the code in combination with the computing system is capable of performing a method, said method comprising:

inserting into a test database a description of the test suite for testing the software application being tested (ABT), said ABT programmed to invoke multiple external software applications during execution of at least one test script of the test suite, each external application being replaced by a corresponding simulator such that the ABT invokes at least one of said corresponding simulators during execution of each test script;

inserting into the test database output data to be returned to the ABT by each simulator for each execution of each simulator in each test script, and after said inserting the description of the test suite and the output data into the test database, executing each test script of the test suite, said executing comprising:

sending a request, by the ABT to each simulator invoked in each test script of the test suite, for requested data; and receiving, by the ABT, said requested data from each simulator invoked in each test script of the test suite, wherein the received requested data comprises the output data that had been inserted into the test database prior to said executing.

The present invention provides a method and system for testing software applications having multiple interfacing applications in a manner that overcomes a lack of access of the interfacing applications.

BRIEF DESCRIPTION OF THE DRAWINGS

FIGS. 8-17 are tables associated with the testing of the software application in FIG. 4, in accordance with embodiments of the present invention.

DETAILED DESCRIPTION OF THE INVENTION

Figure 1:
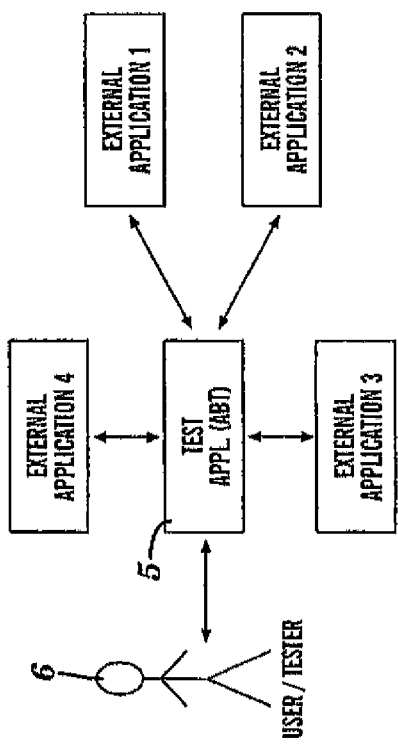
FIG. 1 provides an example of a configuration in which an application being tested (ABT) interacts with multiple external applications and exchanges data with these external applications in accordance with embodiments of the present invention.

The detailed description of the invention is divided into the following sections:
1. High Level Description
2. An Illustrative Example
3. Flow Charts and Tables
4. Computer System
1. High Level Description The present invention provides a method and system for testing a software application ("Application Being Tested" or ABT) that interfaces with multiple external software applications (i.e., a plurality of external software applications) in a simulated test environment. The term "external application" is used herein to denote a software application that resides outside the executable boundaries of the ABT. In particular, any software code that had not been compiled together with the ABT is considered to be "external" to the ABT, and any code that has been compiled together with the ABT to become part of the same executable as the ABT is not external to the ABT. The ABT exchanges data with the external applications and depends on the external applications to perform their functions. Thus, the external applications interface with the ABT, and the ABT interfaces with the external applications.

In accordance with the present invention, the ABT is tested in the absence of the external applications, through replacement of the external applications by simulators. The ABT and the external applications exchange data by transmitting the data in predefined formats over a communication protocol. The data exchange could either be synchronous or asynchronous. Either the ABT or the external application may initiate the communication.

The interaction between the ABT and the external applications may be Application Programming Interface (API)-based, where one of the two interacting applications provides an API that is used by the other application to communicate with it. An API represents a direct programmatic interface between two applications wherein the application code and the API code for the interfacing applications are compiled into a single executable. The underlying communication protocols are hidden behind these APIs and are not possible to replace without substantial effort. In such cases the simulators would have to mimic the APIs. The present invention may be implemented in accordance with these API-based simulators.

Data exchange between the ABT and the external applications could primarily be of various types. In a first type of data exchange, the ABT sends data to the external application and may or may not expect to receive an acknowledgment. In a second type of data exchange, the ABT receives data from the external application and may or may not send out an acknowledgment. In a third type of data exchange, the ABT receives input data from the external application and sends output data to the external application. In a fourth type of data exchange, the ABT sends an output to the external application first and in response receives an input from the external application, In all data exchange types, there is a relationship between the input to the external application from the ABT and the output received by the ABT from the external application. However, there may be circumstances under which the inputs and the corresponding outputs are unrelated.

Each simulator comprises a first aspect and a second aspect. The first aspect mimics the communication protocol between the ABT and the external application. The second aspect implements logic that returns the data expected by the ABT. The present invention keeps the simulators as simple as possible by not replicating the logic of the external applications, as explained infra.

The protocol layer of a simulator mimics the actual protocol between the ABT and the external application that the simulator replaces, and the code of the ABT is not modified to enable testing with a simulator. To modify the code of the ABT would be inefficient, since the additional code that has been added just for testing will have to be needlessly shipped to the production systems as well. Also, such modifications would be fraught with risks, as there is a possibility of this modified code getting enabled in the production environment, leading to system outages and chaos.

From the application perspective, the present invention provides a seamless transition from the simulated test environment to the actual usage environment. However, changes to configuration data sources for the ABT are permitted so that the ABT may be made to point to a simulator that mimics the external application. In some cases, however, where the configuration details are hard-coded in the ABT, a code change may be undertaken so that the ABT is enabled to read these parameters from an external data source. This in turn would allow testers to switch the ABT between the simulators and the real external applications by suitably modifying the appropriate configuration parameters in the external data source. This involves code changes in the ABT, but may be desirable if it would improve the external application.

The present invention may utilize a "tester" or "user" who writes a test script to specifically test a certain predefined characteristic of the ABT. This is achieved by passing appropriate data and posting the appropriate events to the ABT via the test script that triggers the characteristic of the ABT that the tester is interested in. As part of the characteristic being tested, the ABT may interact with one or more external applications. In a simulated test environment, these external applications are replaced by simulators. In response to the requests received from the ABT, these simulators return data to the ABT. To be meaningful for the ABT characteristic(s) being tested, the data returned by the simulators have to be correct in the context of the executing test script.

An approach to ensuring that the simulator returns correct data is to replicate the behavior of the external application by the simulator. This approach is expensive, however, and may be quite undesirable.

Instead of using the preceding approach of replicating the behavior of the external applications by the simulators, the present invention makes the simulators test-script aware such that the simulators are able to return the correct data in the context of the test script. This approach of the present invention is a far simpler approach and frees the simulator from having to replicate behavior of the external application. Thus, when writing a test script for the ABT, the tester or user not only creates the data that is fed into the ABT via the test script, but also creates the data that should be returned by the simulators that come into play for the test script. The input data, and the output data that is returned from the simulators, are linked to the identifier for the test script. The data for the simulators is stored in a centralized data store. The management of the test script data is left up to the software testing tool that is used to execute the test script.

When a test script is executed, a simulator retrieves from the centralized data store the output data that the simulator needs to return to the ABT, using the test script identifier as a key for accessing the output data. Since the multiple simulators are invoked by the ABT for a test script such that the simulators are expected to return consistent data, the tester ensures that the data associated with the simulators for the test script is consistent across the invoked simulators. The simulators are thus entirely test-script driven rather than data driven, as would be the case if the simulators were to have logic that decided the output based on the input.

The approach of the present invention enables the tester to control the end-to-end testing of the ABT, including both the input data that the ABT sends to the simulator and the output data that the ABT receives from the simulator. To ensure that the ABT has sent correct input data to a simulator, the simulator can be enabled to validate the input data that the simulator receives from the ABT against reference input data (i.e., expected input data) previously saved in the centralized data store for the test script being executed.

The simulators could be written in a variety of programming languages and may be deployed in different machines running on different platforms. However, when a test script is executed, the simulator should be aware of the test script id and hence be able to return the output data for the test script when requested by the ABT. To that end, the present invention utilizes a "simulator context". A simulator context is the context of execution of a simulator or group of related simulators. Every simulator is aware of the simulator context that the simulator is executing under and has the means of accessing the simulator context. The simulator context has all the required information to return correct output data for the currently executing test script. In one embodiment, the simulator context is one or more tables in the centralized data store and includes the test script identifier. In this embodiment, a simulator is able to retrieve the output data from the simulator context table(s) in the centralized data store to return to the ABT for the test script.

The simulator context is set before a test script is executed, which may be achieved by setting the test script identifier and other relevant data into a designated table in the centralized data store represented by a relational database. Each simulator, when it is set up, is configured to read this designated table in the relational database to retrieve the simulator context. Retrieving the simulator context means retrieving the data of the simulator context.

The present invention provides software components that help a simulator retrieve the simulator context from the centralized data store. To ensure that simulators running on different platforms and physical machines are able to access the centralized data store, various platform dependent proxy implementations may be provided for these software components. This makes the simulator context accessible from multiple physical machines and platforms.

The simulator context is set before the execution of a test script. Since different testing tools, like Rational Robot or WinRunner could be used to actually execute the test scripts, a software component (called a test execution engine) that is capable of setting the simulator context and then launching these tools to execute the Test Scripts is utilized. The test execution engine is responsible for setting up the simulator context for a test script and then launching the appropriate test tool to execute the test script. Thus when the ABT sends a request to a simulator, the simulator is already aware of the context in which it is executing and hence is capable of returning the correct output data to the ABT.

To enable the simulators to access the centralized data store, a set of utility components are provided by the present invention. This frees the developers of simulators from having to write code each time they want to access the centralized data store or the simulator context.

A simulator may validate the data that the simulator receives from the ABT. To do so, the simulator compares the data it receives from the ABT with reference data in the centralized data store for the test script. Additional utility components are provided that allow simulators to flag a failure on a test script if such validation fails. Even in cases where the simulator received incorrect data from the ABT, the simulator could choose to return correct data to the ABT after flagging an error against the test script.

An alternative approach is to flag an error on the test script and return the correct data, which allows the ABT to proceed along the planned execution path as originally intended by the tester who developed the test case. After the test script has been executed, the test execution engine could determine if any simulator has flagged an error and, if so, issue a communication (e.g., report) indicating that the test script as failed. In this alternative approach, simulators may insert an error record into a predefined table in the centralized data store. Utility software components help the simulators access this predefined table. At the end of a test script execution, the test execution engine queries this predefined table to determine if any of the simulators has flagged an error for the test script.

In one embodiment, a simulator could be accessed by an ABT multiple times within the same simulator context. For each such access, the simulator may return different data sets, would require a mechanism by which the tester is able to define different data sets that a simulator requires to return for each of the multiple requests the simulator receives in the same simulator context. This may be achieved by tagging a sequence number with the data sets associated with a simulator for a test script. The simulator keeps track of the sequence of accesses of the simulator by the ABT under a simulator context and returns the appropriate data by matching the sequence number of the data set with the current access number of the sequence of accesses.

The testing scenarios comprise the following categories of data: the application test data, the data for the test scripts, the data for the simulators, and the data used by the test execution engine. The application test data is stored directly in the data stores used by the ABT and is accessed by the ABT when a test script is executed. The data for the test scripts is the data that is used by the test scripts at runtime and may be used for inputs to the ABT or to control the test script's own execution. Usually each test tool has its own data source where it saves data for its test scripts. The tester ensures that for a given test script all the types of data that come into play are in synch and are meaningful in the context of the test script. The data for the simulators includes the simulator context. The present invention focuses particular relevance on the data for the simulators and the data used by the test execution engine.

Figure 7:
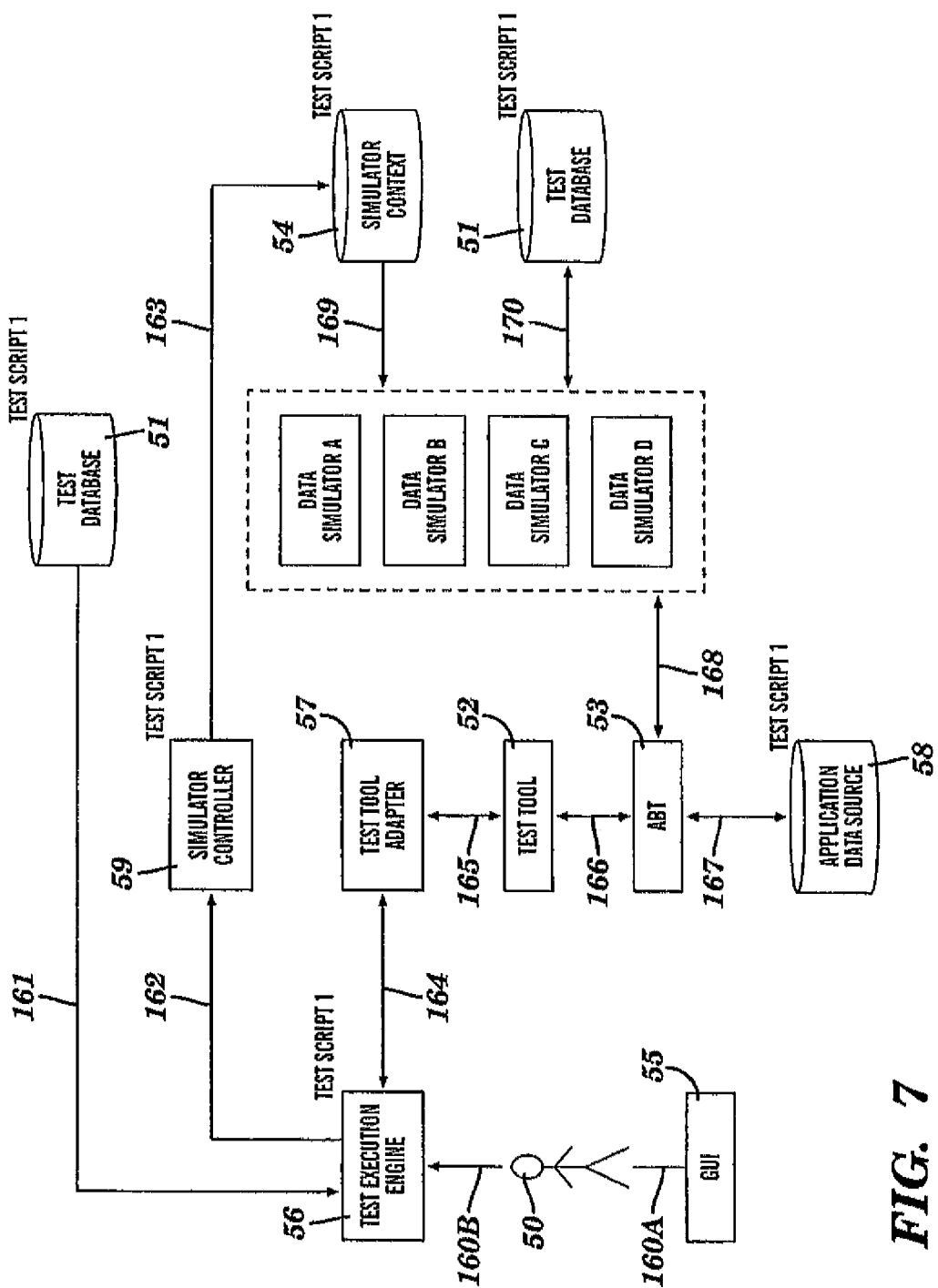
FIG. 7 is a flow chart depicting a runtime setup of a simulator context associated with the testing of the software application in FIG. 4, in accordance with embodiments of the present invention.

To facilitate easy data management for the simulators and the test execution engine, the present invention employs a "data management tool" The data management tool manages the software components (i.e., software tools) and the data that implement the method of the present invention. Thus, the data management tool encompasses and invokes the software tools that the data management tool manages. FIG. 7, discussed infra, depicts software components managed by the data management tool.

The data management tool allows testers to define their own virtual tables with columns, data types, size and other commonly used data element attributes. The data in these virtual tables is presented to the user in the form of a generic data object using which the various data values (column values) may be accessed. The power of this approach is demonstrated in a graphical user interface (GUI) capability of the data management tool developed for the testers to interact with the virtual tables.

The concept of virtual tables is taken further by allowing users to create such tables at run-time to store data for the simulators. The testers using the system can do all this through the GUI tool. Once the tester defines a table, the data management tool's data access component recognizes the defined table as a virtual table and allows typical database operations on such a table (e.g., select/read, insert/create, update and delete—CRUD). Thus, users can change or delete these virtual tables much the same way as with a real database table.

The data layer exposes its functionality in the traditional OR-layer form (Object Relational) for the real tables as well as the generic data objects for the virtual tables. Thus, the access to real tables is through a more conventional OR approach whereas the virtual tables are backed by an interface that allows CRUD-operations on generic data objects. The data source itself could reside within the system boundaries or be external to it as explained in the following item.

The data management tool allows dynamic read access to data sources that are external to the system (e.g., external relational databases), with updating, inserting and deleting data in the external data sources not allowed. Once an external data source is configured, a tester can use the data in the tables within such external data sources. At run-time, the tester can provide the name of the table, and the row selection criteria for data retrieval. The data access component fetches the data and returns the fetched data as generic data objects, just as for the virtual tables.

The GUI tool of the data management tool enables the tester to manage the data for the simulators and the Test Execution Engine effectively and efficiently. This data management tool and its GUI allows the tester to define test scripts, link the test scripts with simulators, and define data for the simulators. The GUI tool is capable of displaying a diagram that visually depicts the test script, the application being tested, and the associated simulators. This helps the tester in visualizing the end-to-end test scenario. Additionally the GUI tool also allows the tester to work with the test execution engine to execute test cases and to view the results of such execution. The data management tool has report generation capabilities that allow the tester to generate reports for test execution.

To allow the tester to exchange data with other systems, the data management tool provides data import and export capabilities (e.g., Excel, XML and flat text files).

To allow testers who are not able to launch the GUI tool for reasons such as working on a server via a telnet session, a command line interface to the data management tool may be used. The command line interface has all the features that are provided by the GUI tool but for the graphical representation. The command line interface provides utility commands that can be used to query the data store that eases the work of the tester.

Thus, the data management tool allows a tester to define and manage data for the simulators, defines and manages test suites, test cases, and test scripts, link test scripts with test execution tools, and link simulators to test scripts. The GUI tool of the data management tool provides views of test suites, test results, generic tables, user defined tables, system tables, and code tables. In addition, the data management tool provides a command line interface.

Apart from the GUI tool, many utility components help in the creation of simulators. Some components take care of the communication protocol between an application and the simulator. These components, which may be in JAVA libraries, greatly reduce the effort required to develop a simulator. It is possible to develop most simulators in the JAVA programming language as long as the simulators (and hence the external applications they simulate) use a protocol to communicate with the ABT. This is true irrespective of the language in which the external application has been written, because the communication protocol acts as a bridge between the simulator and the application and allows both to be on different technologies.

Developing the simulators in JAVA makes the simulators platform neutral owing to the inherent attributes of the JAVA programming language. For example, assume that an application to be tested is written in C++ and uses HTTP to communicate with an external application also written in C++. The external application may be replaced by a JAVA-based simulator if the simulator is able to receive the HTTP request and service the HTTP request as the original C++ application would have.

2. An Illustrative Example

FIG. 1 provides an example of a configuration in which a test application being tested (ABT) interacts with multiple external applications 1-4 and exchanges data with these external applications 1-4, in accordance with embodiments of the present invention. A tester/user 6 of the ABT provides inputs to the ABT. For example, the User/Tester may enter a request in the ABT to retrieve and view some data. Some of the requested data may reside within the ABT and the remainder of the requested data may have to be retrieved by the ABT from the external applications 1-4. The ABT retrieves this data by sending out requests, using already defined communication protocols, to the external applications 1-4. On receiving these requests, the external applications 1-4 respond to the ABT with the appropriate output data. The ABT collates the output data from all of the external applications 1-4 with its own data and displays the collated data to the User/Tester.

To test the ABT for the scenario of FIG. 1, the User/Tester would have to ensure that all the external applications 1-4 from which the test application retrieves data are available. Also, the User/Tester would have to ensure that the data across the ABT and all the external applications 1-4 is consistent for the test scenario. If this is not the case the test case may fail, since the external applications 1-4 will be unable to send the required data in response to the request from the ABT.

To illustrate, consider that a feature of the ABT allows the User/Tester to view the details of an employee in an organization given his employee identification (id). Thus the only input from the User/Tester to the ABT is a valid employee id. In this scenario the User/Tester will have to ensure that the employee id that he gives as input is valid and exists in the ABT. Now further assume that the ABT contains the personal details of the employee which includes his residential address, date of birth, and gender. The employee's salary details are in the external application 1, the details of the employee's current work assignment is in external application 2, the employee's location details like the building, floor, seat no and extension are in external application 3, and the details of the assets assigned to the employee (e.g., personal computer, software, etc.) is in external application 4. However, when the User/Tester checks the details of an employee in the ABT, the user gets a single view having all the above data.

When the User/Tester enters the employee id in the ABT, the ABT uses the employee id to retrieve all the information from the external applications 1-4, collate the retrieved information with the data that the ABT has, and then display the collated information to the User/Tester. This will work only if the employee id is valid in the ABT and in all the external applications 1-4. Thus, when the User/Tester wants to set up a test scenario to test this feature of the ABT, the tester has to ensure that the employee id which the tester plans to use is valid in all the external applications 1-4 as well as the ABT 5 Also there must be valid data associated with the employee id in all the applications 1-4. This could be quite a challenge for complex scenarios where there are multiple applications 1-4 involved and also when the data is not as simple as in the scenario described above for FIG. 1.

In a real world test environment, it may be difficult to ensure that all the external applications required to execute a test case are available and running. Ensuring consistency of data across the ABT and the external applications for the test scenario is also a challenge. Moreover, a test case may not complete successfully, either because one or more of the external applications are unavailable in the test environment when the test case was executed or because of data inconsistencies between the ABT and the external applications.

There may be little that the tester of the ABT can do to control the external applications. Often each external application is managed by a different team. The tester may spend a lot of time and effort coordinating with different teams for these external application to not only ensure that the data for the test scenario is consistent across these applications, but also to ensure that all these external applications are available when the test case is executed.

Figure 2:
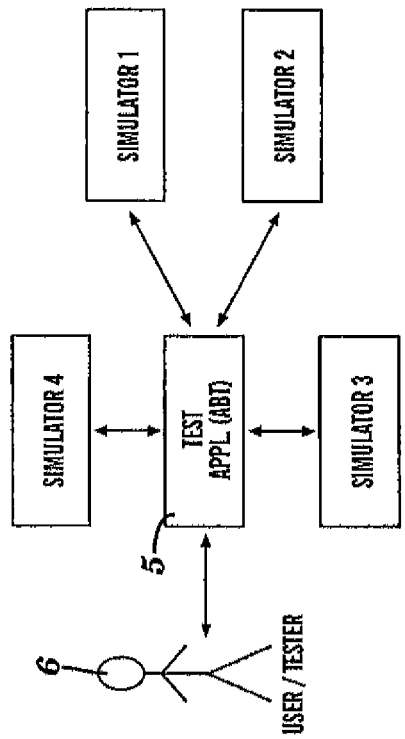
FIG. 2 is a configuration in which the external applications in FIG. 1 have been replaced with simulators, in accordance with embodiments of the present invention.

Accordingly, FIG. 2 is a configuration in which the external applications 1-4 in FIG. 1 have been replaced with simulators 1-4, respectively, in accordance with embodiments of the present invention. A simulator is a simple software application that mimics the communication protocol between the actual external application that it simulates and the ABT. The simulator does not replicate any business logic or functionality of the actual application it simulates. The simulator typically is only capable of responding to the requests that it receives via the communication protocol. The simulator is pre-programmed to respond to different types of requests.

Using simulators, the tester is freed from having to coordinate with multiple teams to ensure that all the external applications are available and have the correct data. The tester controls the simulators and specifies the data that each simulator returns to the ABT.

The challenge of maintaining multiple simulators in synch within the context of a test scenario is addressed by the present invention through a simulator context, which is a mechanism using which multiple simulators that come into play for a specific test scenario can be made to return appropriate responses to the ABT that are consistent with the test scenario. Using the simulator context, the tester assigns the correct response data to the simulators while designing the test scenario, rather than just before executing a test case. The simulator context also allows the tester to non-programmatically manage the data associated with the simulators. The same simulator can be non-programmatically associated with multiple sets of data for various test scenarios before the ABT is tested for any of the test scenarios.

There may be many different ways of implementing the simulator context. One of the ways is to use a centralized data store that is accessible to all the simulators. This centralized data store may be represented by a table in a relational database. This centralized data store stores information about the test case that is being executed. The simulators use this stored information to retrieve and return the correct data to the ABT. Since all the simulators use the same information stored in the centralized data store, the simulators all return the correct data to the ABT in the context of the executing test scenario.

For the test scenario of the example of FIGS. 1-2, assume that the tester desires to test the application for a specific test scenario represented by Test Scenario 1. To be able to do this the tester first needs to use the data management tool to define a test suite. A test suite is a logical collection of test cases. The data management tool allows the tester to manage the test data, especially for the simulators, and help in the execution of test scripts. Assume that the tester creates a new test suite called Test Suite 1.

Figure 3:
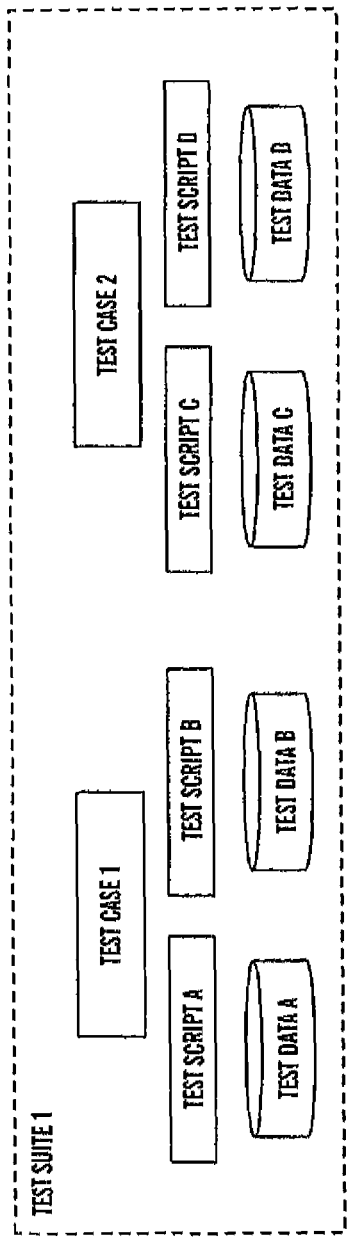
FIG. 3 illustrates a test suite, in accordance with embodiments of the present invention.

Next, the tester defines a test case for the Test Suite 1 as shown in FIG. 3, in accordance with embodiments of the present invention. A test case is a logical collection of test scripts. Each test script has associated test data. The test suites and associated test cases allow the tester to organize the testing activities into logical groups for better management. Assume that the tester defines Test Case 1 and associates the Test Case with the Test Suite 1. FIG. 3 depicts Test Suite 1 as comprising two test cases, namely Test Case 1 and Test Case 2. The tester also defines a test script link. A test script link is the link between the data management tool and the actual test scripts(s) that will be executed to test the ABT. In FIG. 3, Test Case 1 has associated Test Scripts A and B and associated Test Data A and B, respectively. Test Case 2 has associated Test Scripts C and D and associated Test Data C and D, respectively.

The data management tool assumes that the ABT will be tested via automated test scripts developed using an already available testing tool. This is, however, not a mandatory requirement. The data management tool can also be effectively used to manage test data for the simulators even when the testing is performed manually. The data management tool does not have any native test script creation or execution capabilities. The test script link that is created in the data management tool is a logical entity that creates a link between the data management tool and the actual test script. The actual test script itself needs to be created using an already existing testing tool.

The data management tool uses test tool adapters to integrate with the already existing testing tools. Test tool adapters are custom built software components, one for each testing tool, that are pre-built and made available in the data management tool. The test tool adapters enable the test execution engine to integrate with and execute test cases via test tools as illustrated in FIG. 7, described infra.

When a tester defines a test script by using the data management tool, the tester may associate the test script link with an actual test script and a test tool adapter for the testing tool that was used to create the actual test script. If the test script is executed manually, this association is not required. In one embodiment, assume that the tester is performing automated testing using the Rational Robot testing tool and the actual test script that the user has created using Rational Robot for the Test Scenario 1 is called Robot Script 1. Also, assume that Test Tool Adapter that is already pre-built in the data management tool for Rational Robot is called Rational Robot Adapter.

Using the data management tool, the tester defines a new test script called Test Script 1 and associates this test script to Test Case 1. The tester also associates Test Script 1 with the actual test script Robot Script 1 and the test tool adapter Rational Robot Adapter. This completes the basic definition of a Test Suite, Test Case and Test Script for the Test Scenario 1 in the data management tool. The tester also associates Test Script 2 with the actual test script Robot Script 2 and the test tool adapter Rational Robot Adapter.

Next, the tables that will store the data for the simulators are created. The data management tool provides features using which the tester could use the tables to store the data for the simulators. For example, the data management tool may use a relational database management (RDBM) system to store the data for the simulators. The data stored in these tables for the simulators include the data that the simulator needs to return in response to a request from the ABT and the data that the simulator uses to validate the input data that the simulator receives from the ABT as part of the request. Based on the specific test scenario and the data requirement for the simulators, the tester defines the required tables and their columns to store the data. The tester then populates these tables with the data for the test scenario. The data management tool provides a mechanism for populating the data in these tables and maintaining the data.

Next, the test script link and Test Script 1 are associated with the simulators, using the data management tool. Before associating the test script with the simulators, the tester defines the simulators using the data management tool. Defining each simulator creates a logical entry for the simulator in the data management tool. The actual simulator is an application that is developed outside the data management tool. The tester, developer, etc. would build the simulator independently to replace the external application that is being simulated. The data management tool only requires a logical reference to the simulator and does not execute the actual simulator. The tester or the developer who built a simulator would have to ensure that the simulator is correct and is available for testing. In the test scenario of the example of FIGS. 1-3, there are four simulators 1-4, one for each of the four external applications 1-4 that the ABT interfaces with by invoking each of the four external applications 1-4.

All these simulators are built and are available before the testing starts for the ABT. The tester makes a logical entry for each of these simulators in the data management tool. If a logical entry for a particular simulator already exists in the data management tool and is now intended to be reused, then a new logical entry need not be made in the data management tool for the particular simulator. After making the logical entries for the simulators in the data management tool, the tester associates the simulators to the test script. In the example of FIGS. 1-3, the tester associates the four simulators that come into play for the test scenario with Test Script 1. The data management tool allows the tester to do so graphically via a GUI. For each of the simulators, the tester then associates the data that he would have already populated in the tables that he had created earlier. The tester can also add new data or modify the existing data in the tables at this stage. Once the simulators are associated to the test script, and after the data for each of the simulators has been assigned the definition of a test scenario using the data management tool, the test data setup is complete.

To execute the test script, the tester can use the features provided by the data management tool. The tester selects the test script that the tester wishes to execute and run the test script. In the example of FIGS. 1-3, the tester selects Test Script 1. Before doing so, the tester ensures that the simulators required for the test scenario are available and running. In this example, the tester ensures that all the four simulators that will come into play for the test scenario are available. Also the tester has to ensure that the ABT is running and has been correctly configured for the test scenario. The data management tool launches the testing tool associated with the test script via the configured test tool adapter, Rational Robot via the Rational Robot Adapter for this example. The data management tool also uses the test tool adapter to pass the required parameters to the test tool. The test tool in turn executes the actual test script.

Before launching the test tool, the data management tool ensures that the simulator context is appropriately set. The data management tool sets the id of the test script to be executed in the simulator context in addition to other data (e.g., the related test case, test suite, the start time, etc.). This data in the simulator context ensures that all the simulators that come into play for the test scenario are in synch with each other in the context of the executing test script.

The actual test script performs actions on the ABT based on the test scenario that was developed by the tester. As part of the test scenario, the ABT invokes the external applications by sending requests to the external applications which have been replaced by simulators in a manner that is transparent to the ABT. Thus, the ABT is unaware of the simulators (i.e., the simulators having replaced the actual external applications is transparent to the ABT) and continues to generate the requests just like the ABT would do for the actual external applications. On receiving these requests, the simulators perform two actions: validate the data received from the ABT as part of the request; and respond to the ABT. For both these actions, the simulators get the data from the tables defined by the tester while the tester was creating the test script using the data management tool.

The developers who build the simulators have taken care of two aspects. The first aspect mimics the exact communication protocol between the ABT and the external application that the simulator replaces. The second aspect gets the correct data to use for the currently executing test script. The first aspect is handled by the developer on a case by case basis, since the simulators are custom built for each external application. For retrieving the correct data in the context of the executing test script, the developer of the simulator relies on the simulator context. Using a set of APIs that are provided along with the data management tool, the developer can query the information in the simulator context. Using this data and other data associated with the simulator in the data management tool, the developer can retrieve the data to be used for the currently executing test script.

In the scenario of FIGS. 1-3, when Test Script 1 is executed, the simulator (Simulator 1) retrieves data from the tables associated with the Test Script 1 and Simulator 1. Similarly, Simulator 2 extracts the data associated with Simulator 2 and Test Script 1. The simulators become aware of the fact that Test Script 1 is currently executing via the data that Simulator 1 retrieves from the simulator context. Querying the data management tool database with the test script id and the simulator id ensures that the correct data is returned to the simulator in the context of the test script. This is because the tester, while associating the simulators to the test script in the data management tool, has populated the correct data for the test scenario with respect to each of the simulators in the tables.

The data management tool allows the tester to associate different sets of data with the same simulator for different test scenarios. Also within a set of data, the tester is allowed to differentiate between the data that needs to be used for validating the inputs received from the ABT as part of the request and the data that needs to be returned to the ABT by the simulator. This may be implemented by allowing the tester to associate specific tags with the different sets of data.

The data management tools allows the tester to differentiate between the different sets of data that need to be used by the simulator when the same simulator is invoked multiple times during the execution of a single test script. This may be implemented by associating a unique sequence number with each set of data to match the order in which the data needs to be used for a sequence of requests from the ABT in a single test scenario.

On receiving a request from the ABT, the simulator could validate the input data from the application that was received as part of the request. Whether the validation is performed or not may depend on the code written by the developer who built the simulator. Should the simulator do the validation and should this validation fail, the simulator could log this failure in the test data management tool. In one embodiment, the simulators may update the results of the validation in a table in the data management tool. Once the actual test script has been completely executed and the test tool adapter returns control to the data management tool, the data management tool looks up the results from the simulators to determine if any simulator has logged a failure for the test script. If a failure has been logged, then the data management tool fails the entire test script. If no failures have been logged, then the simulators and the test tool adapter do not return a failure and the test script is therefore considered to have passed.

Figure 4A:
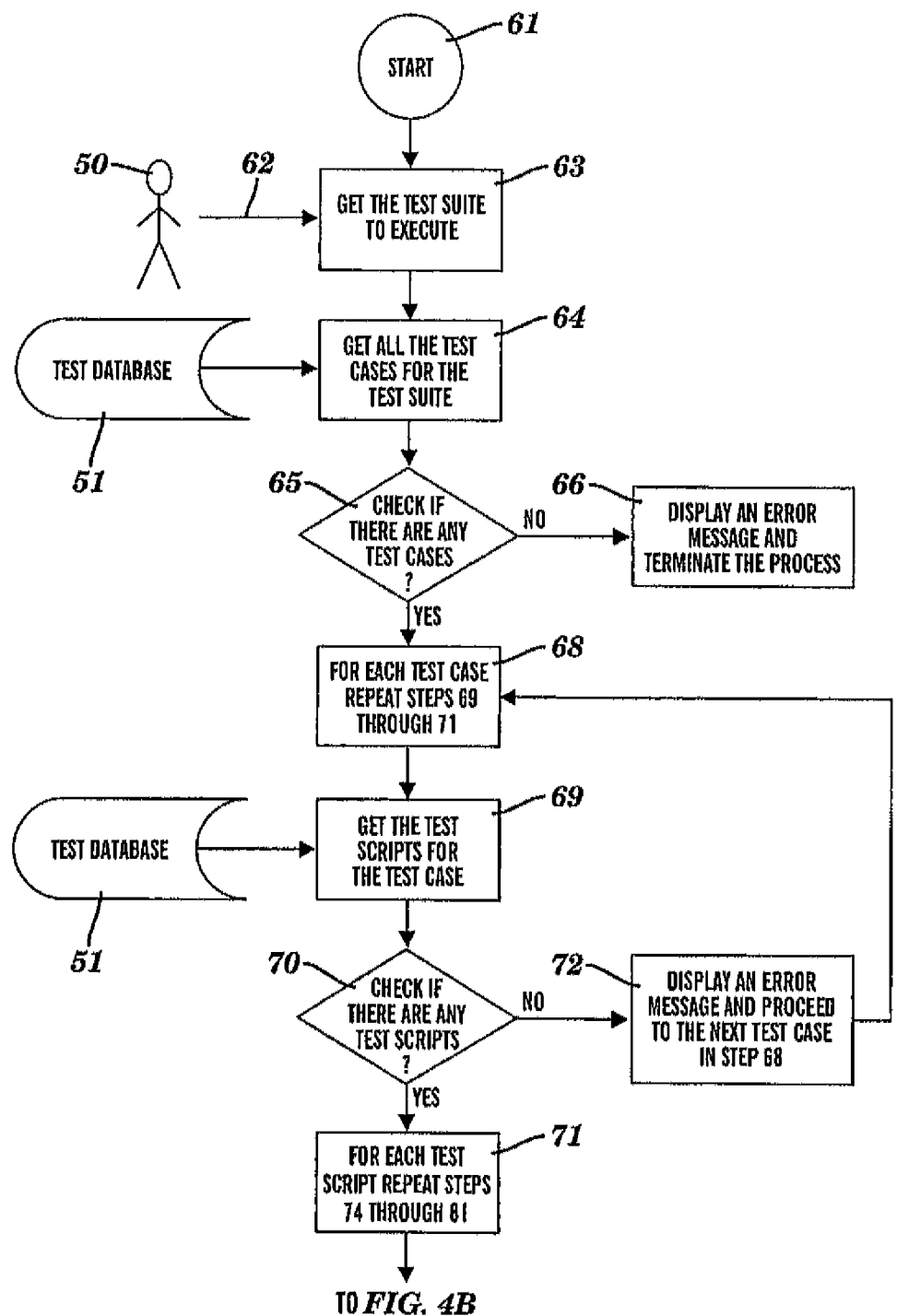
FIG. 4 is a flow chart depicting execution of the testing of a software application from the perspective of a test script and a data management tool, in accordance with embodiments of the present invention.
Figure 4B:
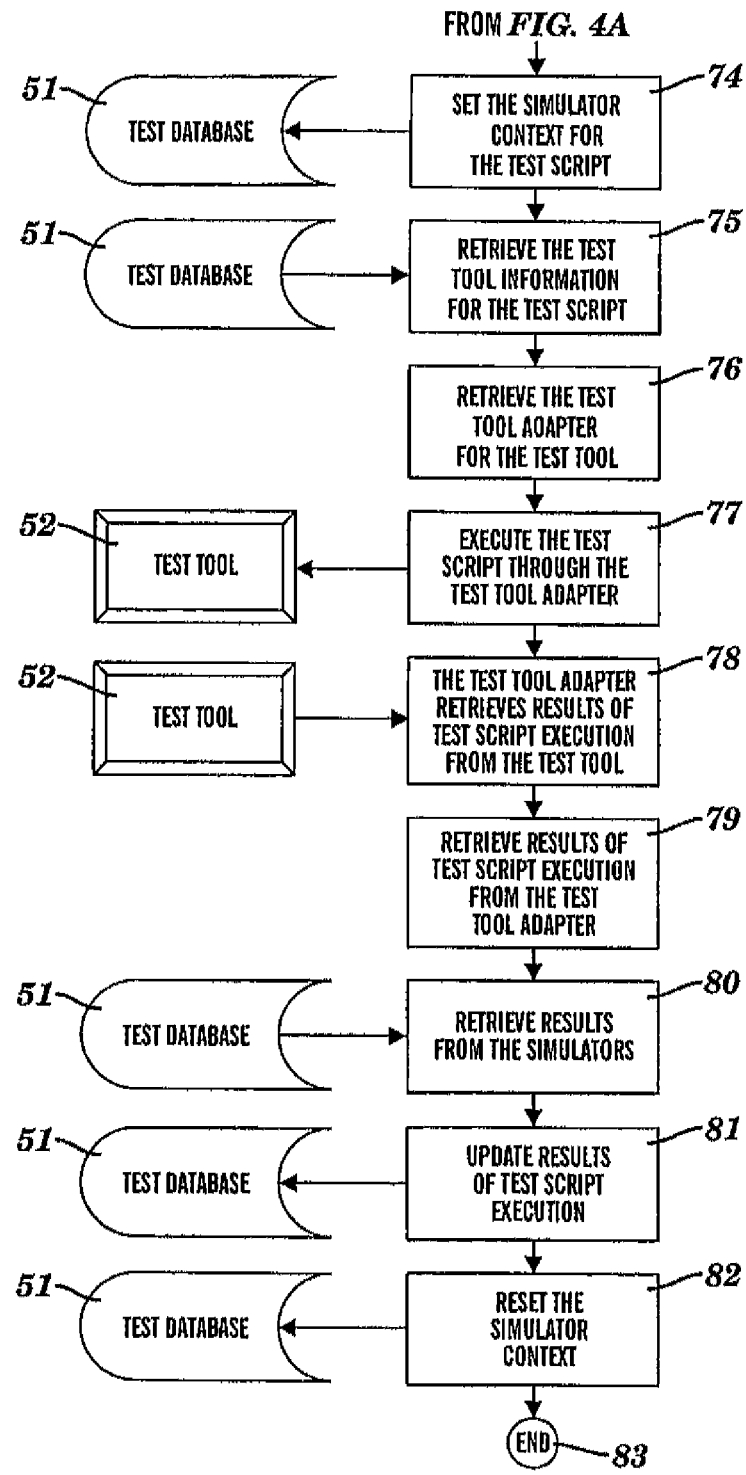

In summary, using the data management tool to test the ABT comprises the following processing components:
1) defining the test suites, test cases and test scripts;
2) recording the actual test script using a testing tool;
3) associating the actual test script with the logical test script link;
4) associating a test tool adapter with the logical test script that will be used to execute the actual test script.
5) defining the tables to hold the data for the simulators;
6) developing the simulators to replace the external applications;
7) defining logical entries for the simulators in the data management tool;
8) associating a test script with the simulators;
9) populating data in the tables for the simulators;
10) associating the data in the tables with a simulator-test script combination;
11) Selecting a test script to execute
12. Setting up the simulator context
13) executing the test script
14) Evaluating the results of the test script execution
3. Flow Charts and Tables FIGS. 4A, 4B, and 4C (collectively "FIG. 4") is a flow chart depicting execution of the testing of the ABT from the perspective of the test script and the data management tool, in accordance with embodiments of the present invention.

In step 61, the process is initiated for the main flow for testing the ABT.

In step 62, a tester 50 uses the data management tool to initiate execution of a test suite, a test case, and a specific test script, all of which had been previously identified specified by the tester 50 and saved by the data management tool in a test database 51. The test database 51 is comprised by the central data store. A test suite is a logical grouping of test cases as specified by the tester 50 when the tester 50 creates the test suites and test cases.

Specifically in step 62 under direction from the data management tool, the tester 50 specifies a test suite. In one embodiment, the tester 50 selects the test suite from the list of test suites that had been previously specified and saved in the test database 51. The database 51 stores all the data required by the test tool 52 as well as the simulated test environment. The test database 51 not only stores the data pertaining to the test scripts and test cases, but also stores data required by the simulators and test tools. The results of test execution are also stored in the test database 51. In another embodiment, the tester 50 directly specifies (to the data management tool) a test case or test script to be executed.

In step 63, the data management tool receives the identification of the test suite specified by the tester 50 in step 62.

In step 64, the data management tool retrieves from the test database 51 all of the test cases associated with the test suite that was specified in step 63.

In step 65, the data management tool checks to determine if there are any test cases associated with the test suite specified by the tester.

If step 65 determines that there are no test cases associated with the specified test suite, then the data management tool displays an error message and terminates execution of the test suite.

If step 65 determines that there are test cases associated with the selected test suite, then in step 68 for each such test case, the data management tool retrieves the test scripts associated with the test case and executes the test scripts one by one, by performing steps 69-71 for each test case. For example, if the test suite has three test cases, then the data management tool retrieves the test scripts associated with each of the three test cases and executes the test script for each test case in steps 69-71.

In step 69, the data management tool retrieves, from the test database 51, the test scripts associated with each of the test cases retrieved in step 64.

If step 70 determines that the test case has no associated test scripts, then the test execution stops for this test case and displays an error message in step 72, and the data management tool proceeds to the next test case in step 68 or terminates execution of the test suite if there are no additional test cases awaiting execution.

If step 70 determines that the test case has one or more associated test scripts, then step 71 executes steps 74-81 for each test script relating to the test case being processed.

In step 74, the data management tool sets, in the test database, the current simulator context pertaining to the test suite being processed. This is the first step for the execution of the test script. The simulator context ensures that all the simulators that come into play for a specific test script are in synch with each other in the context of the test script. In one embodiment, the simulator context is represented by a record in a pre-defined table in the test database.

The data management tool has no capability for executing the test script. Instead, the data management tool invokes an external test tool 52 to execute the test script. The data management tool uses the information about the test tool associated with the test script to determine which test tool needs to be invoked to execute the test script. This association between the test script and the test tool is created by the tester 50 while creating the test script using the data management tool.

In step 75, the data management tool retrieves information about the test tool adapter for the test script from the test database 51.

In step 76, the data management tool retrieves a test tool adapter to invoke the test tool to execute the test script. The test tool adapters are programmatically configured with the data management tool. The tester while creating a test script can associate any of the available test tool adapters with the test script. At run time the data management tool uses the specified test tool adapter to execute the test script.

In step 77, the data management tool executes the test script using the test tool 52 via the test tool adapter. Each test tool requires a different test tool adapter which is programmatically configured with the data management tool. The data management tool retrieves all the information required to execute the test script from the test database 51. If the test script requires some input data, such input data may be passed to test tool 52 via the test tool adapter. All other data that is specific to the test tool 52 is managed and maintained by the test tool 52, and the data management tool is not aware of such data from execution of the test script from the test tool.

In step 78, the test tool adapter retrieves the results (i.e., output data) from execution of the test script. The test tool adapter receives the resulting output data in a format that is specific to the test tool 52. The test tool adapter reformats the resulting output data received from the test tool 52 into a form that the data management tool expects.

In step 79, the data management tool retrieves, from the test tool adapter, the resulting output data.

In step 80, the data management tool queries the test database 51 to retrieve the results logged by the simulators that came into play for the test script. As part of a test script execution if the ABT invokes the simulator by requesting or sending data to a simulator, the simulator validates the inputs that it receives from the application and logs the results of this validation to the test database 51. Thus it is possible that the ABT may have sent incorrect data to a simulator and the validation at a simulator fails as a result of the incorrect data. In this case, the simulator would have logged a failure report against the test script in the test database 51. After a test script has been executed, the data management tool queries the test database 51 to look for such failures. Accordingly, the data management tool retrieves the results logged by the simulators from the test database 51 to determine if the simulators that came into play for the test script have all received correct inputs from the ABT in the context of the test script.

In step 81, the data management tool updates the results from the test script execution in the test database 51. These results are the results logged in the test database by the simulators that have come into play for the test script and the results received from the test tool adapter.

In step 82, the data management tool resets the simulator context in the test database 51 such that the simulator context is deleted from the test database 51. Note that the test database 51 stores the simulator context throughout the execution of the test script. The simulators query the test database 51 to retrieve the simulator context and return the data to the application based on the context. This ensures that all simulators return data to the application that is correct in the context of the executing test script.

In step 83, process of FIG. 4 ends.

Figure 5:
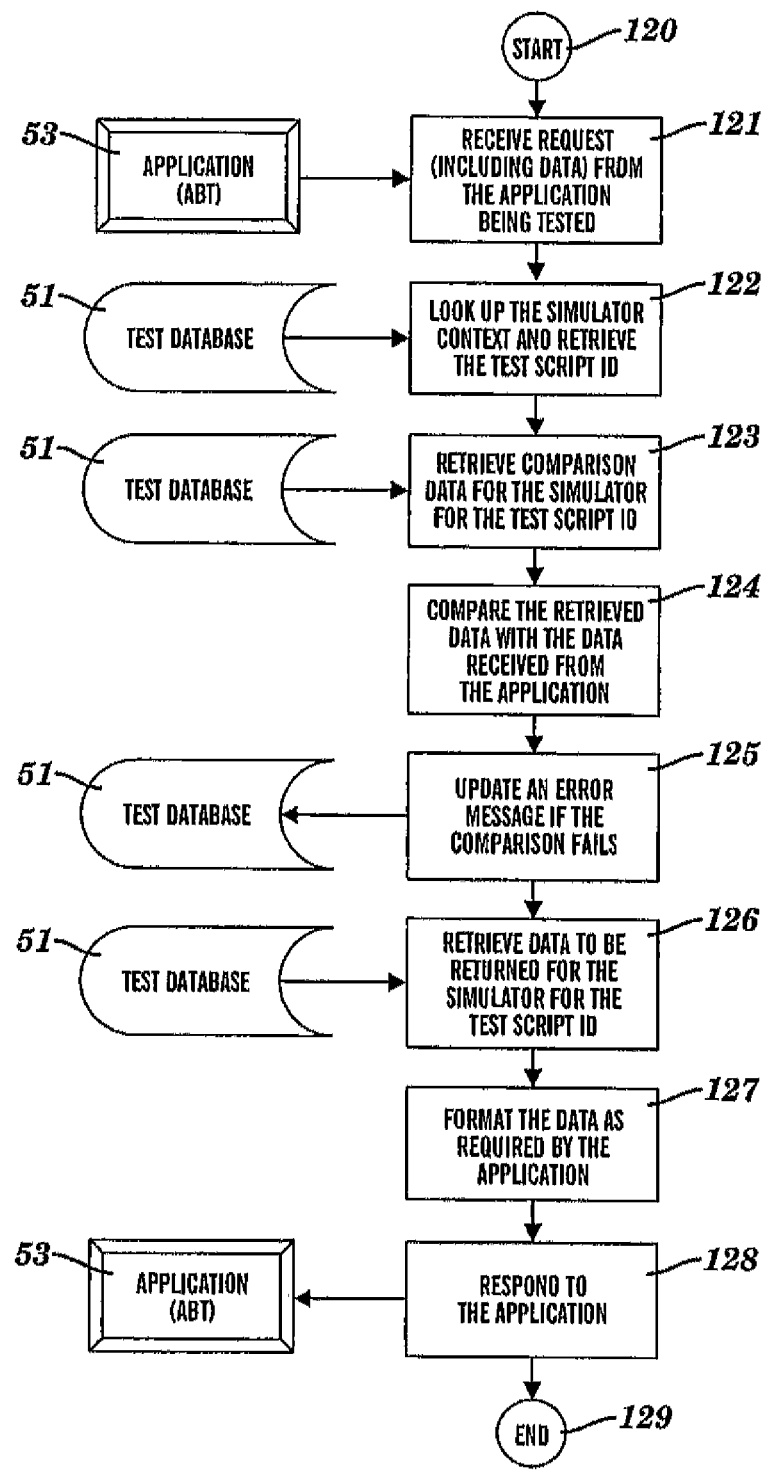
FIG. 5 is a flow chart depicting execution of the test suite associated with the testing of the software application in FIG. 4 from the perspective of a simulator, in accordance with embodiments of the present invention.

FIGS. 5A and 5B (collectively "FIG. 5") is a flow chart depicting execution of the test suite in conjunction with the testing of the software application (ABT 53) in FIG. 4 from the perspective of the simulator, in accordance with embodiments of the present invention. In step 120, the process is initiated for the main flow for testing the test suite execution by a simulator. The simulator is invoked by the ABT by receiving requests from the ABT, validates the request data from the ABT, and responds to the ABT. The simulator performs the preceding tasks within the context of the executing test script. The same simulator may respond differently to the same ABT for a different test script. The test script that is executed via the test tool 52 (see FIG. 4) performs actions in the ABT. As a result of these actions, the ABT needs to interact with multiple external applications which have been replaced by simulators.

In step 121, the simulator is invoked by receiving a request from the ABT. The request may be for data and the ABT sends enough information to identify the requested data. The ABT may send data to the simulator in a same manner as the ABT would send the data to the external application for the external application to process the data. The ABT continues to send the requests and is unaware that the request will be serviced by a simulator that is pre-programmed to return the correct data in the context of the executing test script.

In step 122, the simulator, responsive to receiving the request from the ABT, queries the simulator context in the test database 51 and retrieves data in the simulator context from the database 51.

In step 123, the simulator uses information in the simulator context to retrieve the data that the simulator needs to validate the inputs from the ABT for the test script that is executing. The reference data to be used for comparing with the inputs from the ABT to the simulator for a test script is stored in the test database 51. The tester 50, while associating a simulator to a test script, also specifies the reference data to be used by the simulator to validate the inputs from the ABT.

In step 124, the simulator compares the data received from the ABT with the reference data that it retrieved from the test database 51.

In step 125, the simulator logs an error message in the test database 51 if the simulator detected a mismatch in the comparison in step 124. The test database 51 also stores the results of the validation of the data received from the ABT at the simulator. If the validation fails, the simulator logs an error in the test database 51 against the test script for the simulator.

In step 126, the simulator retrieves the data from the test database 51 that the simulator needs to return to the ABT in response to the request that the simulator receives from the ABT. The simulator uses the information in the simulator context to retrieve the correct data to return in the context of the executing test script.

In step 127, the simulator formats the response data to be returned to the ABT into the form in which the ABT expects to receive the response data. This formatting process is programmed into the simulator.

In step 128, the simulator sends the response data to the ABT. The simulator mimics the same communication protocol as between the ABT and the external application that the simulator simulates in the test environment. The response data would have been decided upon by the tester when the tester associated the simulator with the test script.

In step 129, process of FIG. 4 ends.

Figure 6:
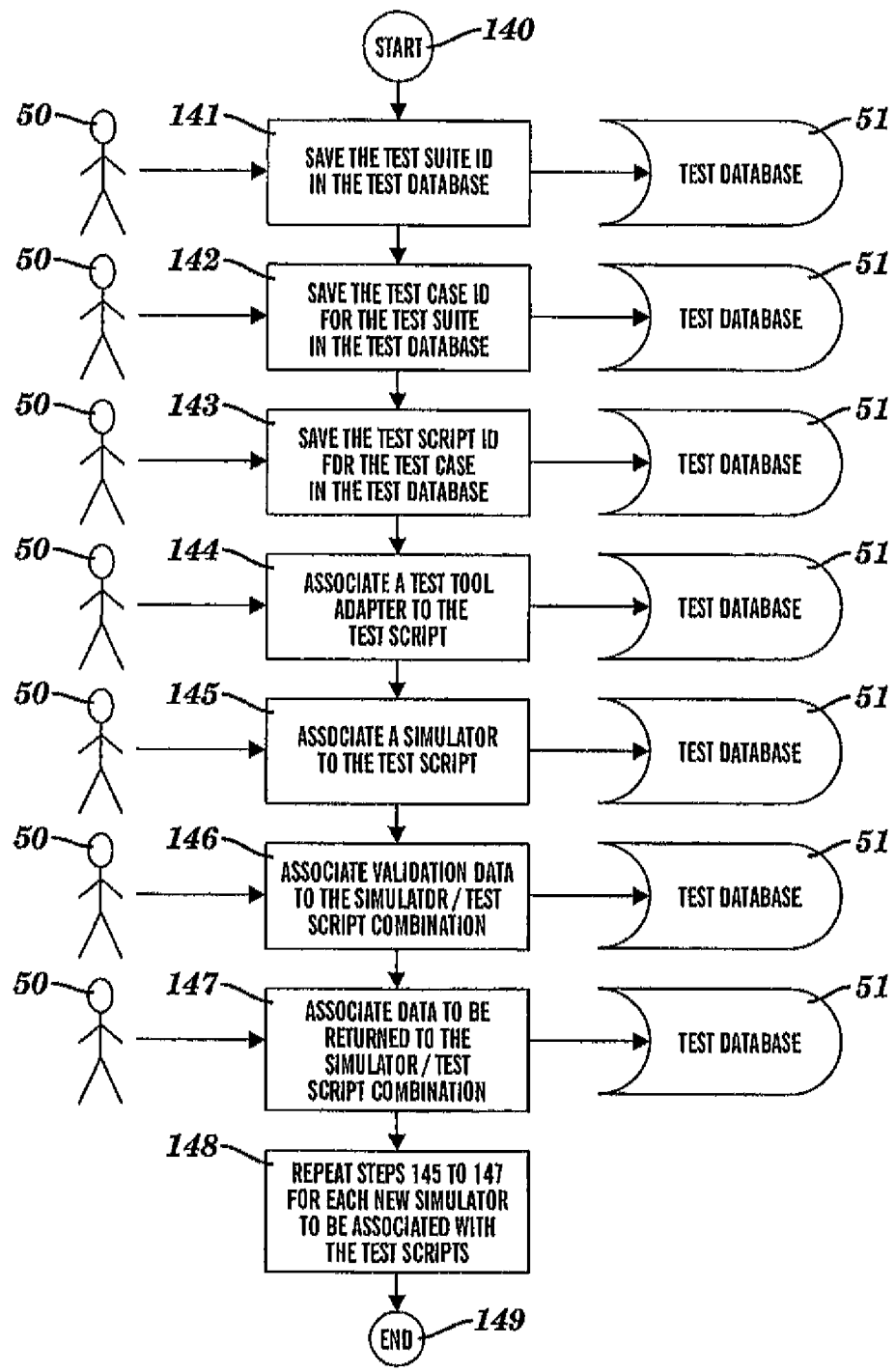
FIG. 6 is a flow chart depicting the data test setup associated with the testing of the software application in FIG. 4, in accordance with embodiments of the present invention.

FIGS. 6A and 6B (collectively "FIG. 6") is a flow chart depicting the data test setup in conjunction with the testing of the software application (ABT) in FIG. 4, in accordance with embodiments of the present invention.

In step 140, the process is initiated for the data test setup for testing the ABT. The tester 50 sets up a test script and the associated data for the simulators, using the data management tool. The tester 50 provides substantially or essentially all the required inputs to the data management tool, and the data management tool saves the input in the test database 51. Unlike the test execution processes of FIG. 4, where the interaction between the tester 50 and the data management tool is minimal, in this process the data management tool mainly acts as a data capture tool where the tester 50 interacts heavily with the data management tool to provide all the required inputs to the data management tool. The tester 50 also sets up all the simulators that will come into play for a test script and provides all the data that the simulators require for the execution of the test script.

In step 141, the tester 50 specifies a test suite identifier which is stored in the test database 51.

In step 142, the tester 50 creates a test case or test cases, and associates each such test case with the test suite. The test case(s) are stored in the test database 51.

In step 143, the tester 50 creates one or more test scripts associated with each test case of the test suite. The test case is logical groupings of the test scripts. A test script is identified by a unique identifier as specified by the tester 50. The id of the one or more test scripts is stored in the test database 51.

In step 144, each test script is associated with a test tool adapter. The tester 50 may select the test tool adapter from the already-defined test tool adapters in the data management tool. The tester 50 can also add a new test tool adapter using different screens provided in the data management tool. The test tool adapter is used by the data management tool to execute the test script when the ABT is being tested.

In step 145, the tester 50 associates the simulator to the test script. The data management tool may provides screens that allows the tester 50 to associate the simulators that come into play when the test script is executed. The data management tool may provide screens that allow the tester to define simulators.

In step 146, reference validation data is associated by the tester 50 to the simulator/test script combination. Each simulator that is assigned to the test script is assigned such validation data. The validation data is also stored in the test database 51. The data management tool allows the tester 50 to define tables that are used to store this validation data in the test database 51. The tester 50 uses table management screens in the data management tool to create and manage these tables that store the validation data used by the simulators. The validation data is used by the simulator to validate the inputs that the simulator receives from the ABT at run time.

In step 147, the data to be returned by the simulators is associated to the simulator/test script combination. The data to be returned by the simulators is to be stored in the test database in tables defined by the tester.

In accordance with step 148, steps 145-147 are repeated for each simulator that is associated with the test script. The data management tool provides a graphical view of the test script along with the simulators that come into play for the test script.

In step 149, process of FIG. 6 ends

FIG. 7 is a flow chart depicting a runtime setup of the simulator context in conjunction with the testing of the software application (ABT) in FIG. 4, in accordance with embodiments of the present invention. The data management tool comprises and manages the GUI 55, the test execution engine 56, the simulator controller 59, and the test tool adapter 57. The data management tool does not comprise the test tool 52.

In step 160A, the tester 50 interacts with the GUI 55 of the data management tool to initiate the execution of a test script in the data management tool. The test execution engine 56 is responsible for having the test adapter 57 execute the test script. Accordingly in step 160B, the test execution engine 56 receives knowledge of the test script created by the user 50.

In step 161, the test execution engine 56 retrieves the details of the test script from the test database 51 and also retrieves the details of the test adapter 57 to be used to execute the test script.

In step 162, the test execution engine 157 invokes the simulator controller 59 of the data management tool to set up the simulator context 54. The simulator controller 59 is responsible for managing the simulator context 54.

In step 163, the simulator controller 59 sets up the simulator context 54 with the details of the test script. This information will be used by the simulators to retrieve the data to be returned by the simulators in the context of the executing test script. The simulator context 54 is maintained in a table in the test database 51.

In step 164, the test execution engine 56 invokes the test tool adapter 57 for the test tool adapter 57 to initiate the execution of the test script.

In step 165, the test tool adapter 57 invokes the test tool 52 that runs the test script. The test tool 52 is external to the data management tool and augments the functionality of the data management tool by providing the test script execution capabilities to the data management tool.

In step 166, the test scrip, via the test tool 52, initiates a sequence of actions in the ABT 53 depending on the test scenario of the test script.

In step 167, the ABT 53 may have its own data source 58 where all the application related data is maintained. Based on the test scenario of the test script, the ABT 53 may access data from this data source 58.

In step 168, the ABT 53 sends a request to an external application. In the simulated test environment this request is picked by a simulator A, B, C, or D that represents the actual external application.

In step 169, the simulator queries the simulator context 54 to retrieve the details of the executing test script.

In step 170, using the information about the test script, the simulator retrieves the data to be used for handling the request from the ABT 53. The ABT 53 may access external applications as per the test scenario of the test script. In the test environment, each such external application is replaced by a simulator.

FIGS. 8-17 are tables associated with the testing of the software application in FIG. 4, in accordance with embodiments of the present invention. These tables may be in a Relational Database Management System (RDBMS).

FIG. 8 depicts the TestSuite table, which stores the data for the test suites in the data management tool. The TestSuite table is updated in step 141 of the flow chart of FIG. 6.

FIG. 9 depicts the TestCase table, which stores the data for the test cases in the data management tool. The TestCases table is accessed in step 64 of the flow chart of FIG. 4 and in step 142 of the flow chart of FIG. 6.

FIG. 10 depicts the TestScript table, which stores the data for the test script in the data management tool. The TestScript table is accessed in step 69 of the flow chart of FIG. 4 and in step 143 of the flow chart of FIG. 6.

FIG. 11 depicts the TestToolSummary table, which stores summary information about the test tools, namely the details of the testing tool to be used to run the test scripts. The TestToolSummary table is accessed in step 75 of the flow chart of FIG. 4 and in step 144 of the flow chart of FIG. 6.

FIG. 12 depicts the SimulatorSummary table, which stores basic information about the simulators in the data management tool.

FIG. 13 depicts the SimulatorContext table, which stores data for the simulator context. The SimulatorContext table is used by the data management tool at run time to store the simulator context dynamically for the particular simulator context being used. The SimulatorContext table is accessed in steps 74 and 82 of the flow chart of FIG. 4, in step 122 of the flow chart of FIG. 5, and in step 163 of the flow chart of FIG. 7.

FIG. 14 depicts the TestScripData table, which stores the relationship between a test script, the simulators associated with the test script, and the data associated with the simulator-test script combination. The TestScripData table is updated when the tester sets up a simulator with a test script and associates the test script with the data to be used by the simulator for the test script. The TestScriptData table is accessed in steps 145-147 of the flow of FIG. 6 and in steps 123 and 126 of the flow chart FIG. 5.

FIG. 15 depicts the SimulatorError table, which is used to store the results of the validation of the data performed at the simulator of the data received at the simulator from the ABT. The SimulatorError table is accessed in step 80 in the flow chart of FIG. 4 and in step 125 in the flow chart of FIG. 5.

FIG. 16 depicts the TestExecutionResult table, which is used to capture the results of the test execution. The TestExecutionResult table is accessed in step 81 in the flow chart of FIG. 4.

FIG. 17 depicts the TestRunDetails table, which Stores basic details about the run of a test suite. The data management tool updates the TestRunDetails table each time a test script is executed.

4. Computer System

Figure 18:
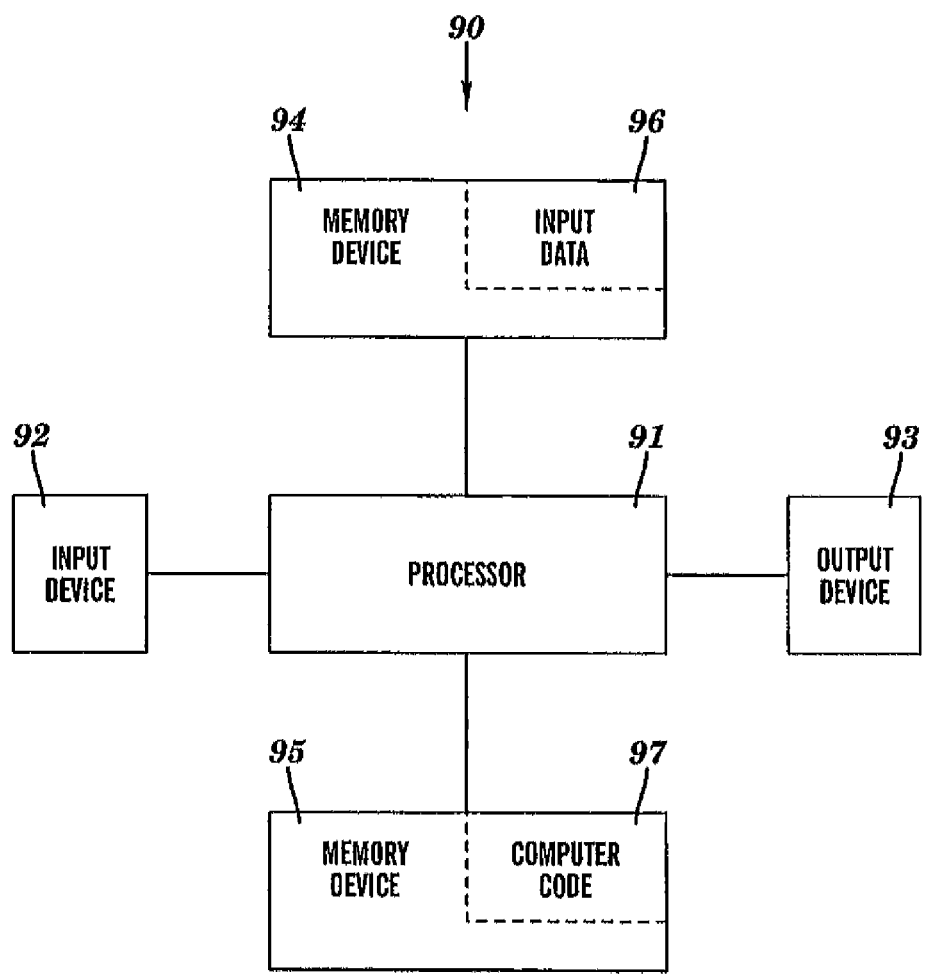
FIG. 18 illustrates a computer system used for testing a software application interfacing with multiple external software applications in a simulated test environment, in accordance with embodiments of the present invention.

FIG. 18 illustrates a computer system 90 used for testing a software application interfacing with multiple external software applications in a simulated test environment, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for testing a software application interfacing with multiple external software applications in a simulated test environment, The algorithm may be embodied in the data management tool and the software components managed by the data management tool. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 18) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for testing a software application interfacing with multiple external software applications in a simulated test environment.

While FIG. 18 shows the computer system 90 as a particular configuration of hardware and software, any configuration of hardware and software, as would be known to a person of ordinary skill in the art, may be utilized for the purposes stated supra in conjunction with the particular computer system 90 of FIG. 18. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method for testing a software application in accordance with a test suite, said method comprising:

inserting into a test database, by a processor of a computer system, a description of a test suite for testing the software application being tested (ABT), said ABT programmed to invoke multiple external software applications to request data from each external application invoked, each external application being replaced by a corresponding simulator such that the ABT invokes at least one of the corresponding simulators, instead of invoking the external application replaced by the corresponding simulator, during said execution of a test script;

after said inserting the description of the test suite, said processor executing the test script created by a testing tool, said executing the test script comprising using a test tool adapter to execute the test script, said test tool adapter being invoked by a test execution engine to initiate said executing the test script, said test tool adapter invoking the testing tool to perform said executing the test script, and wherein said executing the test script comprises: (i) said ABT sending a request to each simulator invoked in the test script for requested data that would otherwise be supplied to the ABT by the external application replaced by each simulator; and (ii) said ABT receiving the requested data from each simulator invoked in the test script, wherein the received requested data comprises output data that had been inserted into the test database prior to said executing the test script;

said processor retrieving, via said test tool adapter, resulting output that resulted from said execution of the test script; and said processor updating the test database with the resulting output.

2. The method of claim 1, said method further comprising:

said processor retrieving, via said test execution engine, details of the test script; and said processor invoking, via said test execution engine, a simulator controller to set up a simulator context table in the test database with the details of the test script, wherein said retrieving resulting output comprises using the details of the test script in the simulator context table to retrieve the resulting output.

3. The method of claim 2, wherein said inserting into the test database the description of the test suite comprises:

storing in the simulator context table in the test database: TestSuiteId data identifying the test suite, TestCaseId data identifying a test case of the test suite, and TestScriptID identifying the test script of the test suite;

storing in a TestScript table of the test database: TestCaseId, TestScriptID, and TestToolId identifying the testing tool; and storing in a TestScriptData table of the test database: TestScriptID and SimId identifying a simulator of the corresponding simulators invoked during execution of the test script.

4. The method of claim 1, wherein during said executing the test script, each external application is replaced by the corresponding simulator in a manner that is transparent to the ABT.

5. The method of claim 1, wherein said sending and receiving by the ABT with respect to each simulator invoked by the ABT is in accordance with a same communication protocol that would have prevailed between the ABT and each corresponding external application had said each simulator not been replaced by said corresponding external application.

6. The method of claim 1, said method further comprising:

said processor receiving in a SimulatorError table in the test database a recording by a first simulator invoked by the ABT of an indication of an error in input data transmitted by the ABT to the invoked first simulator during said sending, said indication of the error identifying the invoked simulator, the test script, and the test suite.

7. The method of claim 6, wherein the test database comprises reference validation data against which the input data transmitted by the ABT has been compared to determine that the input data comprises said error.

8. The method of claim 7, wherein the test database comprises a TestExecutionResult table and a TestRunDetails table, wherein the TestExecutionResult table comprises TstScriptId data that identifies the executed test script for which a result of said executing is being logged and TestRunID data serving as a foreign key to the TestRunDetails table, and wherein the TestRunDetails table comprises the TestRunID data and comments relating to said result.

9. The method of claim 1, wherein a first simulator of the corresponding simulators is invoked more than one time during said executing the test script, and wherein the output data is different each time the first simulator is invoked during said executing the test script.

10. The method of claim 1, wherein the received requested data from each simulator consists of data that would have been returned to the ABT from execution of the invoked external software applications in response to the request had the invoked external software applications not been replaced by the invoked simulators, and wherein logic utilized by execution of the invoked external software applications is not replicated by the invoked simulators.

11. A computer program product, comprising a computer readable memory device having computer readable program code stored therein, said program code configured to be executed by a processor of a computer system to implement a method for testing a software application in accordance with a test suite, said method comprising:

said processor inserting into a test database a description of a test suite for testing the software application being tested (ABT), said ABT programmed to invoke multiple external software applications to request data from each external application invoked, each external application being replaced by a corresponding simulator such that the ABT invokes at least one of the corresponding simulators, instead of invoking the external application replaced by the corresponding simulator, during said execution of a test script;

after said inserting the description of the test suite, said processor executing the test script created by a testing tool, said executing the test script comprising using a test tool adapter to execute the test script, said test tool adapter being invoked by a test execution engine to initiate said executing the test script, said test tool adapter invoking the testing tool to perform said executing the test script, and wherein said executing the test script comprises: (i) said ABT sending a request to each simulator invoked in the test script for requested data that would otherwise be supplied to the ABT by the external application replaced by each simulator; and (ii) said ABT receiving the requested data from each simulator invoked in the test script, wherein the received requested data comprises output data that had been inserted into the test database prior to said executing the test script;

said processor retrieving, via said test tool adapter, resulting output that resulted from said execution of the test script; and said processor updating the test database with the resulting output.

12. The computer program product of claim 11, said method further comprising:

said processor retrieving, via said test execution engine, details of the test script; and said processor invoking, via said test execution engine, a simulator controller to set up a simulator context table in the test database with the details of the test script, wherein said retrieving resulting output comprises using the details of the test script in the simulator context table to retrieve the resulting output.

13. The computer program product of claim 11, wherein during said executing the test script, each external application is replaced by the corresponding simulator in a manner that is transparent to the ABT.

14. A computer system comprising a processor and a computer readable memory unit coupled to the processor, said memory unit containing instructions that when executed by the processor implement a method for testing a software application in accordance with a test suite, said method comprising:

said processor inserting into a test database a description of a test suite for testing the software application being tested (ABT), said ABT programmed to invoke multiple external software applications to request data from each external application invoked, each external application being replaced by a corresponding simulator such that the ABT invokes at least one of the corresponding simulators, instead of invoking the external application replaced by the corresponding simulator, during said execution of a test script;

after said inserting the description of the test suite, said processor executing the test script created by a testing tool, said executing the test script comprising using a test tool adapter to execute the test script, said test tool adapter being invoked by a test execution engine to initiate said executing the test script, said test tool adapter invoking the testing tool to perform said executing the test script, and wherein said executing the test script comprises: (i) said ABT sending a request to each simulator invoked in the test script for requested data that would otherwise be supplied to the ABT by the external application replaced by each simulator; and (ii) said ABT receiving the requested data from each simulator invoked in the test script, wherein the received requested data comprises output data that had been inserted into the test database prior to said executing the test script;

said processor retrieving, via said test tool adapter, resulting output that resulted from said execution of the test script; and said processor updating the test database with the resulting output.

15. The computer system of claim 14, said method further comprising:

said processor retrieving, via said test execution engine, details of the test script; and said processor invoking, via said test execution engine, a simulator controller to set up a simulator context table in the test database with the details of the test script, wherein said retrieving resulting output comprises using the details of the test script in the simulator context table to retrieve the resulting output.

16. The computer system of claim 14, wherein during said executing the test script, each external application is replaced by the corresponding simulator in a manner that is transparent to the ABT.

17. A process for deploying computing infrastructure, said process comprising integrating computer-readable code into a computer system, wherein the code in combination with the computer system is configured to perform a method for testing a software application in accordance with a test suite, said method comprising:

inserting into a test database, by a processor of the computer system, a description of a test suite for testing the software application being tested (ABT), said ABT programmed to invoke multiple external software applications to request data from each external application invoked, each external application being replaced by a corresponding simulator such that the ABT invokes at least one of the corresponding simulators, instead of invoking the external application replaced by the corresponding simulator, during said execution of a test script;

after said inserting the description of the test suite, said processor executing the test script created by a testing tool, said executing the test script comprising using a test tool adapter to execute the test script, said test tool adapter being invoked by a test execution engine to initiate said executing the test script, said test tool adapter invoking the testing tool to perform said executing the test script, and wherein said executing the test script comprises: (i) said ABT sending a request to each simulator invoked in the test script for requested data that would otherwise be supplied to the ABT by the external application replaced by each simulator; and (ii) said ABT receiving the requested data from each simulator invoked in the test script, wherein the received requested data comprises output data that had been inserted into the test database prior to said executing the test script;

said processor retrieving, via said test tool adapter, resulting output that resulted from said execution of the test script; and said processor updating the test database with the resulting output.

18. The process of claim 17, said method further comprising:

said processor retrieving, via said test execution engine, details of the test script; and said processor invoking, via said test execution engine, a simulator controller to set up a simulator context table in the test database with the details of the test script, wherein said retrieving resulting output comprises using the details of the test script in the simulator context table to retrieve the resulting output.

19. The process of claim 17, wherein during said executing the test script, each external application is replaced by the corresponding simulator in a manner that is transparent to the ABT.

* * * * *